United States Patent [19]

Pernick

[11] 4,334,780
[45] Jun. 15, 1982

[54] OPTICAL SURFACE ROUGHNESS DETECTION METHOD AND APPARATUS

[75] Inventor: Benjamin J. Pernick, Hampton Bays, N.Y.

[73] Assignee: Grumman Aerospace Corporation, Bethpage, N.Y.

[21] Appl. No.: 53,331

[22] Filed: Jun. 29, 1979

[51] Int. Cl.³ .................. G01B 11/30; G01N 21/47
[52] U.S. Cl. .................................. 356/359; 356/446
[58] Field of Search ............................ 356/359, 446

[56] References Cited

U.S. PATENT DOCUMENTS

| | | |
|---|---|---|
| 3,551,061 | 12/1970 | Glowa . |
| 3,771,880 | 11/1973 | Bennett .......................... 356/446 |
| 3,782,827 | 1/1974 | Nisenson ...................... 356/446 X |
| 3,790,287 | 2/1974 | Cuthbert et al. . |
| 3,804,521 | 4/1974 | Sprague ........................ 356/359 |
| 3,850,526 | 11/1974 | Corey ............................ 356/446 |
| 3,857,637 | 12/1974 | Obenreder . |
| 3,877,777 | 4/1975 | Glenn, Jr. . |
| 3,879,131 | 4/1975 | Cuthbert et al. . |
| 3,892,494 | 7/1975 | Baker et al. . |
| 3,917,414 | 11/1975 | Gels et al. . |
| 3,922,093 | 11/1975 | Dandliker .................... 356/446 X |
| 3,964,830 | 6/1976 | Ikeda et al. . |
| 3,972,616 | 8/1976 | Minami et al. . |
| 4,030,830 | 6/1977 | Holly . |
| 4,139,307 | 2/1979 | Clarke .......................... 356/446 |

OTHER PUBLICATIONS

Ohtsubo, J. and T. Asakura, "Statistical Properties of Speckle Intensity Variations in the Diffraction Field Under Illumination of Coherent Light", Optics Communications vol. 14, No. 1, May 1975, pp. 30–34.
Takai, N., "Relation Between Statistical Properties of Surface Roughness and the Averaged Speckle Intensity in the Diffraction Field", Optics Communications.
Hayes, L. P., "Scanner for Opaque Samples", IBM Technical Disclosure Bulletin, vol. 16, No. 9, 2826–2820, 1974.
Heinz, A., "Method of Checking Wall Imperfections", Western Electric Technical Digest, No. 19, B1–32, 1970.

Primary Examiner—John K. Corbin
Assistant Examiner—Bruce Y. Arnold
Attorney, Agent, or Firm—Morgan, Finnegan, Pine, Foley & Lee

[57] ABSTRACT

An optical method and apparatus for noncontacting inspection of a specimen to evaluate quantitatively its surface roughness characteristics are disclosed.

The distribution of light scattered by a Gaussian rough surface illuminated with a laser beam is obtained with a transform and cylinder lens pair (for a one-dimensional light distribution), or by a transform lens alone (for a two-dimensional Gaussian light distribution) when no tooling marks, scratches, etc., would mar the surface and mask the measurement. Spatial frequency halfwidths of the optical Fourier transform spectrum of the scattered light are known to be linearly related to the planar surface roughness characteristics. Hence, with appropriate calibration, the measured light distribution halfwidths can be used to evaluate surface roughness. Measurements are not restricted to planar surfaces; curved specimen shapes can be employed with appropriate optical adjustments. Beam forming components can also be used to achieve similar surface roughness measurements on curved shapes, such as a conical mirror for use with cylindrical or tapered holes.

11 Claims, 4 Drawing Figures

OPTICAL SURFACE ROUGHNESS DETECTION METHOD AND APPARATUS

BACKGROUND OF THE INVENTION

This invention relates to a noncontacting optical method and apparatus for evaluating the surface roughness characteristics of a specimen. More specifically, it relates to the application of certain phenomena and relationships of optics to the generation, detection and interpretation of scattered light diffraction patterns created by illuminating the surface of the specimen undergoing testing with coherent light.

Surface finish roughness modifies the reflected light properties by introducing diffuse scattering superposed upon a specular reflection. The light appears speckled due to constructive and destructive interference fluctuations between coherent light waves scattered from surface irregularities. The distribution of scattered light is a direct consequence of surface roughness.

The ability to quantify optically surface roughness measurements is of value in several areas; e.g., automatic sensing of surface qualities in hazardous and remote environments, as a diagnostic aid to evaluate tool wear and defects, quality control inspection, and automatic machining and finishing of critical parts. Noncontacting measurements and rapid response are features of importance. Practical usage requires surface quality inspection of machined metal specimens to be made rapidly over relatively large areas and in shop environments.

Presently used methods have several drawbacks. Most rely heavily upon subjective machine operator or inspector skills and experience, the use of reference or comparison templates, contacting stylus mechanical devices such as PROFILOMETERS, or microscope interferometry techniques. Some other reflective optical procedures involve specimen motion, beam motion, or probe scanning. Unfortunately, such measurements are usually time-consuming and limited to small sample regions.

It is apparent that the major limitations of the presently used methods are that they are labor intensive and the quality of the product varies with the skills of the technician.

It is accordingly a general object of the present invention to provide a noncontacting method and apparatus for evaluating the surface roughness characteristics of a specimen. More specifically, it is an object of the invention to overcome the aforementioned limitations associated with the known techniques.

It is a particular object of the invention to provide an optical method and apparatus for evaluating surface roughness characteristics of a specimen.

Other objects will be apparent in the following detailed description and practice of the invention.

SUMMARY OF THE INVENTION

The foregoing and other objects and advantages which will be apparent in the following detailed description of the preferred embodiment, or in the practice of the invention, are achieved by the invention disclosed herein, which generally may be characterized as a method and apparatus for optically evaluating the surface roughness characteristics of a specimen having a surface characterized by Gaussian statistics, the method comprising the steps of: illuminating the surface of the specimen with a source of coherent light; forming on detecting means located in the far field a joint one-dimensional image and orthogonal Fourier transform spectrum distribution of the light scattered by the surface of the specimen, the joint distribution being characterized by a one-dimensional Gaussian function; and analyzing the shape of the joint one-dimensional image and orthogonal Fourier transform spectrum distribution to determine the surface roughness characteristics of the specimen; and the apparatus comprising; coherent light means for illuminating the surface of the specimen with coherent light; cylindrical-spherical lens means for forming on detecting means located in the far field a joint one-dimensional image and orthogonal Fourier transform spectrum distribution of the light scattered by the surface of the specimen, the joint distribution being characterized by a one-dimensional Gaussian function; and means for analyzing the shape of the joint one-dimensional image and orthogonal Fourier transform spectrum distribution to determine the surface roughness characteristics of the specimen.

BRIEF DESCRIPTION OF THE DRAWINGS

Serving to illustrate an exemplary embodiment of the invention are the drawings of which.

DETAILED DESCRIPTION OF THE PREFERRED EMBODIMENT

Figure 1A:
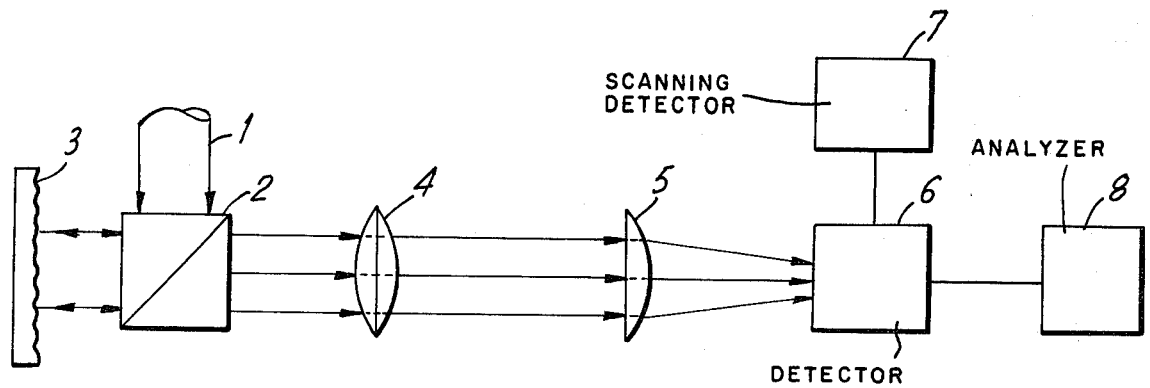
FIG. 1a is a schematic illustration of the optical surface roughness apparatus with a one dimension re-image capability for one-dimensional measurements.

The present invention is based on the unique optical Fourier transform properties of lenses in coherent light. For a given optical setup, properties of the Fourier transform spectrum, or the diffraction pattern, of coherent light reflected from the surface of a specimen under investigation, such as distribution of energy, symmetries, or polarization depend upon the nature of the illuminated surface. The diffraction pattern for a smooth surface reflection depends upon the illumination aperture; for example, a well-known sinc function is obtained for a rectangular illumination aperture. For reflecting surfaces with increasing roughness, the diffraction for the reflected light becomes mottled and speckled. However, the average light distribution, i.e., average for a given sample area or for an ensemble of identical scatterers, is Gaussian in shape for a Gaussian rough surface. A measure of the Gaussian shape of the diffracted light distribution is linearly related to the surface roughness parameters of the specimen.

It is well known that the characteristics of scattered light due to random, isotropic (Gaussian) surface roughness depends upon two surface parameters; namely the surface height roughness (e.g., average or rms height variation) and the correlation length (e.g., the spatial variation of the height profile). These quantities are usually denoted by the symbols $\sigma$ and $\tau$ respectively, in the literature.

When the ratio of surface height roughness to wavelength, $2\pi \sigma/\lambda$, is much greater than one, the surface is said to be a rough scatterer. To a close approximation, the distribution of scattered light in the diffraction pattern is given by the following expression:

$$I = \frac{2}{1 + \sqrt{1-\chi^2}} \cdot \exp\left[\frac{-\chi^2 (\tau/\sigma)^2}{4(1 + \sqrt{1+\chi^2})^2}\right]$$

where:

I is the light intensity as a function of $\chi$, normalized to its value at $\chi=0$;

$\chi$ is the sine function of the scattering angle measured from the normal to the surface; and exp denotes the exponential function.

It is noted that the theoretical distribution of scattered light in the diffraction pattern with angle is, on the average Gaussian in shape. The width of the Gaussian curve is proportional to the ratio $\sigma/\tau$ for the rough scatterer case. Hence, the optical system's measurement will also be proportional to $\sigma/\tau$, that is the average diffraction pattern distribution will be Gaussian in shape with a halfwidth proportional to the ratio $\sigma/\tau$.

For weak scatterers, on the other hand, the quantity $2\pi \sigma/\lambda$ is much less than one. As a first order approximation, the distribution of scattered light in the diffraction pattern is given by the following expression:

$$I = \frac{(1 + \sqrt{1-\chi^2})^2}{4} \cdot$$

$$\exp\left[-\left(4\pi^2 \frac{\sigma^2}{\lambda^2}\right) \cdot \left[\frac{\chi^2\tau^2}{\sigma^2} + (1 + \sqrt{1-\chi^2})^2 - 4\right]\right]$$

where:

I is the light intensity as a function of $\chi$, normalized to its value at $\chi=0$;

$\chi$ is the sine function of the scattering angle measured from the normal to the surface;

and exp denotes the exponential function.

It is noted that the scattered light angular distribution is also Gaussian in shape (as an average result). The width of the Gaussian curve is now proportional to terms that involve $\sigma$ and $\tau$, but not solely proportional to the ratio $\sigma/\tau$.

Thus, a measurement of the signature curve taken at two wavelengths for which $2\pi \sigma/\tau$ is either greater or less than one will enable one to determine $\sigma$ and $\tau$ and consequently completely specify the Gaussian random surface properties.

In certain applications only a measurement of the surface height roughness $\sigma$ may be of interest. In these cases, one needs only a measurement of the signature curve at a single wavelength $\lambda$ for which the surface acts as a rough scatterer, and a preestablished calibration curve relating known roughness $\sigma$ and signature curve halfwidth.

The far field diffraction pattern of light scattered by a small, rough surface area is obtained with a coherent optical system and used to quantify roughness measurements of surfaces. The distribution can be anisotropic due to tooling marks, preferential wear, etc. A cylinder lens forms a one-dimensional transform spectrum at favorable angular orientations about the optic axis with respect to the surface sample to circumvent this problem and provides useful spectrum averaging.

A schematic representation of the optical surface roughness detection apparatus with a one dimension re-image capability for one-dimensional measurements, is illustrated in FIG. 1a. The light beam size used to illuminate an area of the specimen would be established by optical components and methods not shown in the figure. These components and methods are known to those experienced in the technology. Other modifications of the illustrated optical system may be apparent from the teachings of this system. For example, the beam splitting means may be eliminated and the illumination beam may be directed at an angle to the surface of the specimen.

Referring to FIG. 1a, light from a source of coherent light 1, such as, for example, a laser, is deflected by means 2, such as, for example, a beam splitter, onto a surface of the specimen 3 undergoing inspection. Light that is reflected and scattered in two dimensions by the surface is gathered by a transform lens 4, and re-imaged in one direction by a cylindrical lens 5 whose focusing action is in the plane of the figure. The cylindrical lens 5 is positioned such that a one-dimensional image of the illuminated area is formed at the detector plane 6. The cylindrical lens 5 can be rotated about its optic axis to prealign this lens in a favorable angular orientation. The detector 6 is located in or near the back focal plane of the transform lens 4 such that components of the scattered light diffraction pattern normal to the plane of the figure (and thus unaffected by the cylindrical lens), are focused onto the detector. It is noted that other lens combinations can be used to vary the size of the cylindrical lens imagery and of the diffraction pattern by methods well known to those versed in the state-of-the-art. Similarly, it is noted that the position of the transform and cylinder lenses can be reversed to accommodate such design features as optical magnification, overall size, etc. The one dimension diffraction pattern can be measured and mapped with the aid of a scanning detector 7 (or with a fixed detector array). The mapped distribution of the scattered light diffraction pattern is presented to analyzer 8 for analysis and surface roughness signature recognition.

The Gaussian shape, expressed as a halfwidth, or more accurately, the angular width of the diffraction pattern in spatial frequency units at the half power points, is known to be related to the surface roughness parameters $\sigma$ and $\tau$. The laser wavelength $\lambda$ serves as a scaling parameter to alter the spread of the Gaussian shaped distribution of the scattered light.

The complete surface can be covered by movement of the specimen relative to the laser beam by well known methods. The results of the measurements for each portion of the complete specimen can be stored in the analyzer 8 and processed after the full specimen has been surveyed.

Figure 1B:
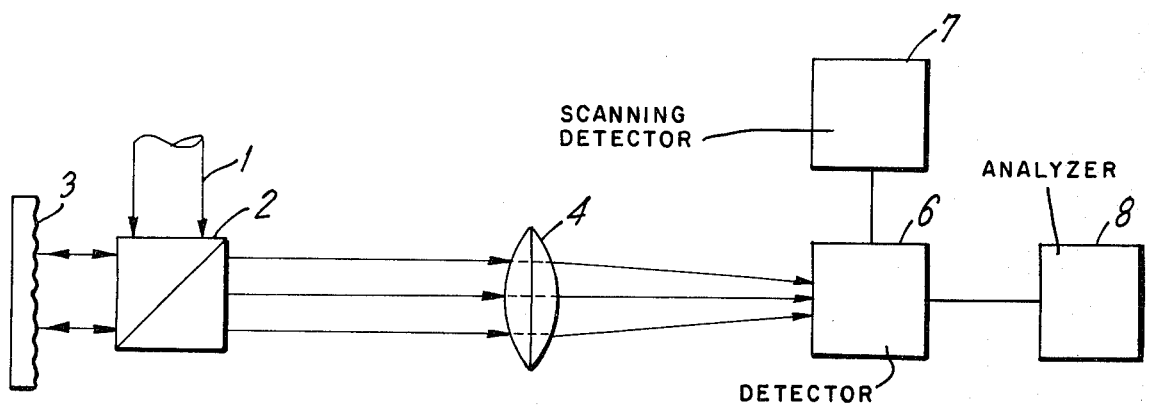
FIG. 1b is a schematic illustration of the optical surface roughness apparatus for two-dimensional measurements.

FIG. 1b is a schematic illustration of the optical surface roughness apparatus for two-dimensional measurements. Its operation is similar to the operation of the optical apparatus illustrated in FIG. 1a, except that it does not utilize a cylinder lens to reimage the two-dimensional light distribution formed by transform lens 4. This setup is conveniently utilized when the specimen to be evaluated has no tooling marks, scratches, etc., which would mar the surface and mask the measurement. In this case, the two-dimensional light distribution obtained by the transform lens alone is usually sufficient to permit quantitative evaluation of its surface roughness characteristics.

The invention can be used with curved surfaces as well as planar regions, i.e., it may be adapted for utilization with surfaces that are curved in one direction, so-called cylinder surfaces. To accommodate other surface geometries, beam shaping optical components would be used to illuminate the specimen under test.

Figure 2A:
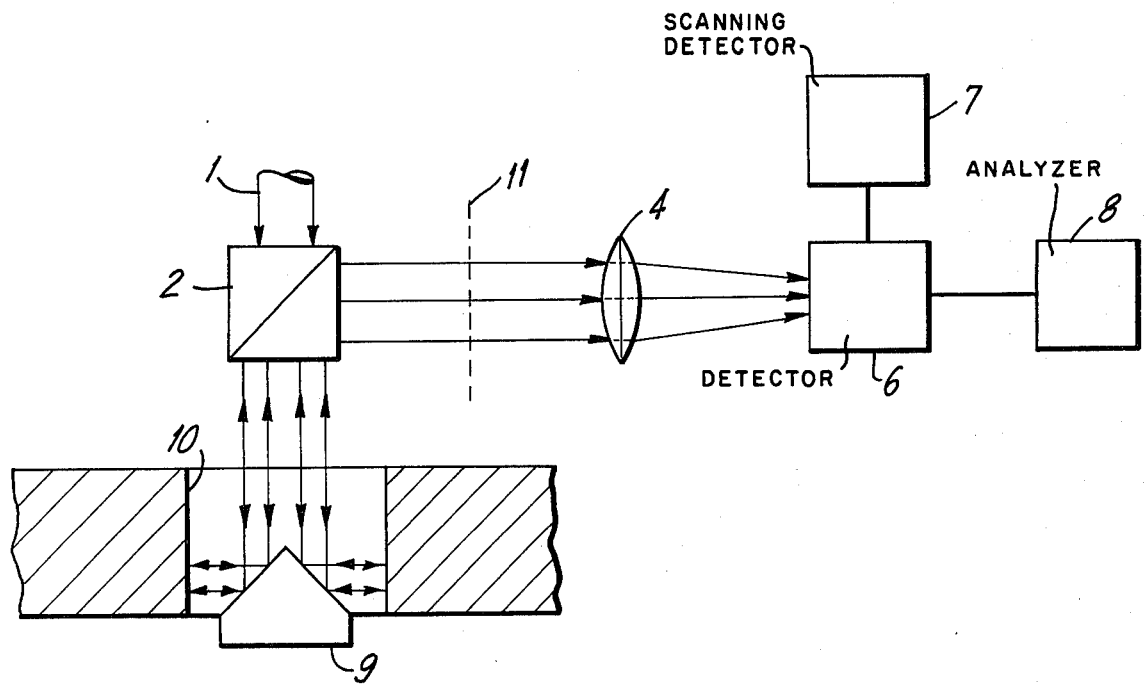
FIG. 2a is a schematic representation of an optical surface roughness detection apparatus adapted to make measurements in a cylindrical or tapered hole.

A schematic representation of an optical surface roughness detection apparatus adapted to make measurements in a cylindrical or tapered hole is illustrated in FIG. 2a. As shown therein, a laser beam 1 passed through a beam splitter 2 and illuminates a curved reflector 9. For this application, the reflector has a conical reflection surface. The surface angle is such as to reflect the incident beam into a plane at about 90 degrees from the original beam axis. The cone-reflected beam is incident upon the inner surface of the cylindrical hole 10 (shown in sectional view). Light is back reflected from the hole 10 to the conical reflection surface 9 and to the beam splitter 2. A ring like distribution of light in one-to-one correspondence with the inner surface of the hole is reflected off the surface of the beam splitter 2 and formed in a plane normal to the optic axis, such as plane 11. A transform lens 4 is used to form the diffraction pattern of the conically-illuminated surface on a detector plane 6. The radial distribution of light in the detection plane 6 normal to the optic axis will be Gaussian for a Gaussian roughness hole surface. The detected distribution of the scattered light is mapped and analyzed as described above.

Figure 2B:
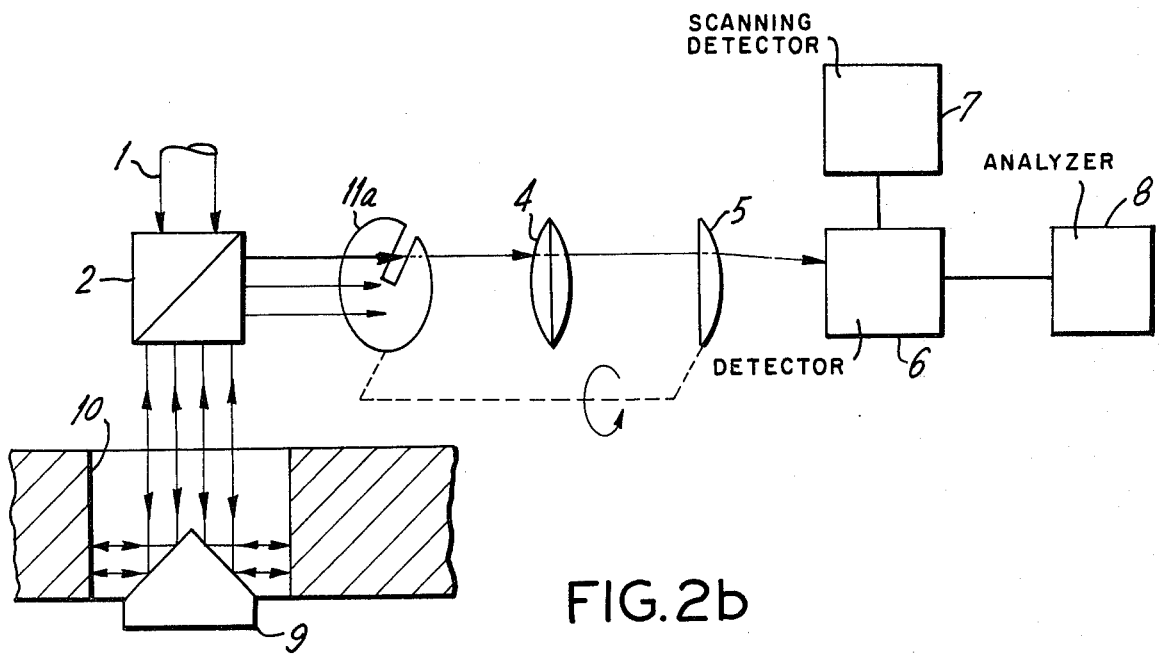
FIG. 2b is a schematic representation of a modification of the optical system of FIG. 2a to enable the measurement of a portion of a cylindrical or tapered hole, by means of a rotatable slit and astigmatic lens combination.

In the modification illustrated in FIG. 2b, an aperture with a slit 11a in the radial direction is used in conjunction with a cylinder lens 5. The action of the slit 11a-cylinder lens 5 combination is to allow only the light from a narrow region of the inner hole surface 10 to be analyzed. The approximate size of this region is determined by the geometric projection of the slit 11a onto the inner hole surface 10. The slit 11a-cylinder lens 5 pair would be rotated about the optic axis in unison to sample different regions of the hole 10. Scattered light in the direction parallel to the slit narrow dimension is not affected by the cylinder lens 5, and by means of the transform lens 4, forms the diffraction pattern distribution to by analyzed.

It is clear that the above description of the preferred embodiment in no way limits the scope of the present invention which is defined by the following claims.

What is claimed is:

1. A method for optically evaluating the surface roughness characteristics of a specimen having a surface characterized by Gaussian statistics comprising the steps of:
   (a) illuminating the surface of the specimen with a source of coherent light;
   (b) forming on detecting means located in the far field a joint one-dimensional image and orthogonal Fourier transform spectrum distribution of the light scattered by the surface of the specimen, said joint distribution being characterized by a one-dimensional Gaussian function; and
   (c) analyzing the shape of the joint one-dimensional image and orthogonal Fourier transform spectrum distribution to determine the surface roughness characteristics of the specimen.

2. A method for optically evaluating the surface roughness characteristics of a specimen having a surface characterized by Gaussian statistics comprising the steps of:
   (a) illuminating the surface of the specimen with a source of coherent light;
   (b) imaging in one direction on detecting means located in the far field a one-dimensional image distribution of the light scattered by the surface of the specimen;
   (c) focusing simultaneously in an orthogonal direction on said detecting means a one-dimensional Fourier transform spectrum distribution of the light scattered by the surface of the specimen;
   (d) mapping the joint one-dimensional image and orthogonal Fourier transform spectrum distribution, said joint distribution being characterized by a one-dimensional Gaussian function; and
   (e) analyzing the shape of the mapped joint one-dimensional image and Fourier transform spectrum distribution to determine the surface roughness characteristics of the specimen.

3. A method as recited in claim 2 including the step of moving the specimen in a predetermined manner relative to said source of coherent light to evaluate an extended area of the surface.

4. A method as recited in claim 2 wherein the step of illuminating the surface of the specimen includes illuminating beam splitting means with a source of coherent light; and reflecting one of the resulting divided beam of light at an arbitrary angle between zero and ninety degrees onto the surface of the specimen.

5. A method as recited in claim 4 further including the step of transmitting selectively through aperture means only a portion of the light scattered by the surface of the specimen.

6. Apparatus for optically evaluating the surface roughness characteristics of a specimen having a surface characterized by Gaussian statistics comprising:
   (a) coherent light means for illuminating the surface of the specimen with coherent light;
   (b) cylindrical-spherical lens means for forming on detecting means located in the far field a joint one-dimensional image and orthogonal Fourier transform spectrum distribution of the light scattered by the surface of the specimen, said joint distribution being characterized by a one-dimensional Gaussian function; and
   (c) means for analyzing the shape of the joint one-dimensional image and orthogonal Fourier transform spectrum distribution to determine the surface roughness characteristics of the specimen.

7. Apparatus for optically evaluating the surface roughness characteristics of a specimen having a surface characterized by Gaussian statistics comprising:
   (a) laser means for illuminating the surface of the specimen with coherent light;
   (b) cylindrical lens means for imaging in one direction on detecting means located in the far field a one-dimensional image distribution of the light scattered by the surface of the specimen;
   (c) spherical lens means for focusing simultaneously in an orthogonal direction on said detecting means a one-dimensional Fourier transform spectrum distribution of the light scattered by the surface of the specimen;
   (d) means for mapping the joint one-dimensional image and orthogonal Fourier transform spectrum distribution, said joint distribution being characterized by a one-dimensional Gaussian function; and (e) means for analyzing the shape of the mapped joint one-dimensional image and orthogonal Fourier transform spectrum distribution to determine the surface roughness characteristics of the specimen.

8. Apparatus as recited in claim 7 including means for moving the specimen in a predetermined manner relative to said laser means to evaluate an extended area of the surface.

9. Apparatus as recited in claim 7 including beam splitting means interposed between the specimen and said laser means for reflecting a divided beam of light at an arbitrary angle between zero and ninety degrees onto the surface of the specimen.

10. Apparatus as recited in claim 9 further including aperture means interposed between the specimen and said cylindrical-spherical lens means for transmitting selectively only a portion of the light scattered by the surface of the specimen to said cylindrical-spherical lens means.

11. Apparatus as recited in claim 10 further including means for moving the specimen in a predetermined manner relative to said laser means; and means for synchronously rotating said aperture means and one of said cylindrical-spherical lens means.

* * * * *

UNITED STATES PATENT AND TRADEMARK OFFICE
CERTIFICATE OF CORRECTION

PATENT NO. : 4,334,780
DATED : June 15, 1982
INVENTOR(S) : Benjamin J. Pernick

It is certified that error appears in the above—identified patent and that said Letters Patent is hereby corrected as shown below:

Column 3, line 10     the term "$\sqrt{1 + x^2}$" in the denominator of the exponential function should read -- $\sqrt{1 - x^2}$ --;

Claim 4, line 4     the word "beam" should read --beams--.

Signed and Sealed this

Seventeenth Day of August 1982

[SEAL]

Attest:

GERALD J. MOSSINGHOFF

Attesting Officer     Commissioner of Patents and Trademarks

UNITED STATES PATENT AND TRADEMARK OFFICE
CERTIFICATE OF CORRECTION

PATENT NO. : 4,334,780
DATED     : June 15, 1982
INVENTOR(S) : Benjamin J. Pernick It is certified that error appears in the above-identified patent and that said Letters Patent is hereby corrected as shown below:

Column 1, line 36    delete "such as PROFILOMETERS"

Signed and Sealed this

Sixth Day of December 1983

[SEAL]

Attest:

GERALD J. MOSSINGHOFF

Attesting Officer          Commissioner of Patents and Trademarks

UNITED STATES PATENT AND TRADEMARK OFFICE
CERTIFICATE OF CORRECTION

PATENT NO. : 4,334,780

DATED : June 15, 1982

INVENTOR(S) : Benjamin J. Pernick

It is certified that error appears in the above—identified patent and that said Letters Patent are hereby corrected as shown below:

Column 1, line 36    delete the term "PROFILOMETERS" and insert the term --PROFILOMETER instruments--.

Signed and Sealed this

Fifteenth Day of May 1984

[SEAL]

Attest:

Attesting Officer

GERALD J. MOSSINGHOFF

Commissioner of Patents and Trademarks